United States Patent
Brunson

(10) Patent No.: US 8,855,292 B1
(45) Date of Patent: Oct. 7, 2014

(54) AGENT-ENABLED QUEUE BYPASS TO AGENT

(75) Inventor: Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 2177 days.

(21) Appl. No.: 11/518,096

(22) Filed: Sep. 8, 2006

(51) Int. Cl.
*H04M 3/00* (2006.01)
*H04M 5/00* (2006.01)

(52) U.S. Cl.
USPC ............ 379/266.01; 379/266.02; 379/266.03

(58) Field of Classification Search
USPC .......................... 379/266.01, 266.02, 266.03
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,166,974 A | 11/1992 | Morganstein et al. |
| 5,185,782 A | 2/1993 | Srinivasan ............... 379/207.03 |
| 5,206,903 A | 4/1993 | Kohler .................... 379/214.01 |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,402,474 A | 3/1995 | Miller et al. ............... 379/93.12 |
| 5,436,965 A | 7/1995 | Grossman et al. |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

Virtual Hold® Technology "Solutions—WebConnect" (printed Oct. 9, 2003) available at http://www.virtualhold.com/webconnect.htm, 2 pages.

(Continued)

*Primary Examiner* — Nafiz E Hoque
(74) *Attorney, Agent, or Firm* — Sheridan Ross P.C.

(57) ABSTRACT

A contact center is provided that has (a) a database 114 operable to contain customer records; (b) a plurality of agent communication devices 134-1 to -N corresponding to a plurality of agents; (c) a switching fabric 110, 130 to connect incoming contacts with agent communication devices; (d) a plurality of contact queues 208*a-n* to enqueue contacts awaiting servicing by an agent; and (e) a queue bypass module that receives, from a first agent of a contact center, a queue bypass request for a specified first customer and updates a set of data structures associated with the specified first customer to indicate that the first customer is entitled to bypass queue positions when the first customer again contacts the contact center.

13 Claims, 5 Drawing Sheets

(56) References Cited

U.S. PATENT DOCUMENTS

| | | |
|---|---|---|
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,559,878 A | 9/1996 | Keys et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,657,382 A | 8/1997 | Tamagawa et al. ........... 379/211 |
| 5,684,872 A | 11/1997 | Flockhart et al. |
| 5,684,964 A | 11/1997 | Powers et al. |
| 5,689,698 A | 11/1997 | Jones et al. |
| 5,696,811 A | 12/1997 | Maloney et al. ............. 379/111 |
| 5,701,295 A | 12/1997 | Bales et al. |
| 5,703,943 A | 12/1997 | Otto ........................... 379/245 |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,668 A | 4/1998 | Pepe et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson ................ 379/265.06 |
| 5,790,677 A | 8/1998 | Fox et al. |
| 5,793,861 A | 8/1998 | Haigh ........................... 257/693 |
| 5,794,250 A | 8/1998 | Carino, Jr. et al. |
| 5,796,393 A | 8/1998 | MacNaughton et al. |
| 5,802,163 A | 9/1998 | Miloslavsky ............ 379/266.09 |
| 5,802,282 A | 9/1998 | Hales et al. |
| 5,818,907 A | 10/1998 | Maloney et al. |
| 5,825,869 A | 10/1998 | Brooks et al. ............ 379/265.12 |
| 5,825,870 A | 10/1998 | Miloslavsky ............ 379/114.01 |
| 5,828,747 A | 10/1998 | Fisher et al. ............. 379/265.12 |
| 5,838,968 A | 11/1998 | Culbert |
| 5,839,117 A | 11/1998 | Cameron et al. |
| 5,867,562 A | 2/1999 | Scherer |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson ................. 379/265.12 |
| 5,903,877 A | 5/1999 | Berkowitz et al. ................. 705/9 |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,940,497 A | 8/1999 | Miloslavsky ................. 370/352 |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,978,465 A | 11/1999 | Corduroy et al. ............. 379/243 |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 5,999,965 A | 12/1999 | Kelly ........................... 709/202 |
| 6,000,832 A | 12/1999 | Franklin et al. |
| 6,009,157 A | 12/1999 | Bales et al. |
| 6,011,844 A | 1/2000 | Uppaluru et al. |
| 6,021,428 A | 2/2000 | Miloslavsky ................. 709/206 |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. ......... 379/265.05 |
| 6,049,547 A | 4/2000 | Fisher et al. |
| 6,049,603 A | 4/2000 | Schwartz et al. ............. 379/309 |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,130,933 A | 10/2000 | Miloslavsky ............. 379/90.01 |
| 6,141,328 A | 10/2000 | Nabkel et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,223,165 B1 | 4/2001 | Lauffer ............................. 705/1 |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,230,287 B1 | 5/2001 | Pinard et al. ..................... 714/31 |
| 6,233,333 B1 | 5/2001 | Dezonmo |
| 6,240,417 B1 | 5/2001 | Eastwick |
| 6,259,786 B1 | 7/2001 | Gisby |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,320,956 B1 | 11/2001 | Cherry ..................... 379/265.01 |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. .................... 709/224 |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |

(56) References Cited

U.S. PATENT DOCUMENTS

| | | | |
|---|---|---|---|
| 6,560,707 B2 | 5/2003 | Curtis et al. | |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,636,599 B1 | 10/2003 | Mullen | 379/265.05 |
| 6,650,748 B1 | 11/2003 | Edwards et al. | |
| 6,697,457 B2 | 2/2004 | Petrushin | |
| 6,697,858 B1 | 2/2004 | Ezerzer et al. | |
| 6,704,409 B1 | 3/2004 | Dilip et al. | |
| 6,707,903 B2 | 3/2004 | Burok et al. | |
| 6,724,885 B1* | 4/2004 | Deutsch et al. | 379/265.02 |
| 6,738,353 B2 | 5/2004 | Chong | |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,798,877 B2 | 9/2004 | Johnson et al. | |
| 6,934,381 B1* | 8/2005 | Klein et al. | 379/265.09 |
| 6,947,543 B2 | 9/2005 | Alvarado et al. | |
| 7,012,888 B2 | 3/2006 | Schoeneberger et al. | |
| 7,035,927 B2 | 4/2006 | Flockhart et al. | |
| 7,124,098 B2 | 10/2006 | Hopson et al. | |
| 7,215,759 B2 | 5/2007 | Brown et al. | |
| 7,222,075 B2 | 5/2007 | Petrushin | |
| 7,236,583 B2 | 6/2007 | Beckstrom et al. | |
| 7,245,711 B2 | 7/2007 | Margolis | |
| 7,260,203 B2 | 8/2007 | Holt et al. | |
| 7,274,787 B1* | 9/2007 | Schoeneberger | 379/265.01 |
| 7,760,867 B2* | 7/2010 | Walker et al. | 379/266.01 |
| 2003/0174830 A1 | 9/2003 | Boyer et al. | |
| 2003/0177017 A1 | 9/2003 | Boyer et al. | |
| 2003/0195753 A1* | 10/2003 | Homuth | 705/1 |
| 2004/0019808 A1 | 1/2004 | Devine et al. | |
| 2004/0039846 A1 | 2/2004 | Goss et al. | |
| 2004/0081311 A1 | 4/2004 | Thompson | |
| 2004/0161097 A1 | 8/2004 | Henry | |
| 2004/0184593 A1 | 9/2004 | Elsey et al. | |
| 2004/0193475 A1 | 9/2004 | Hemm et al. | |
| 2004/0203660 A1* | 10/2004 | Tibrewal et al. | 455/414.1 |
| 2004/0203878 A1 | 10/2004 | Thomson | |
| 2004/0235509 A1* | 11/2004 | Burritt et al. | 455/519 |
| 2005/0089155 A1* | 4/2005 | Isenberg | 379/266.01 |
| 2005/0182672 A1 | 8/2005 | Hemm et al. | |
| 2005/0238163 A1* | 10/2005 | Brown et al. | 379/266.01 |
| 2006/0177034 A1 | 8/2006 | Reding et al. | |
| 2008/0037764 A1* | 2/2008 | Lee et al. | 379/266.01 |

FOREIGN PATENT DOCUMENTS

| | | | |
|---|---|---|---|
| EP | 0501189 | 9/1992 | |
| EP | 0 701 358 A1 | 3/1996 | H04M 3/42 |
| EP | 0 740 450 A2 | 10/1996 | H04M 3/50 |
| EP | 0772335 | 5/1997 | |
| EP | 0829996 | 3/1998 | |
| EP | 0855826 | 7/1998 | |
| EP | 0863651 | 9/1998 | |
| EP | 0866407 | 9/1998 | |
| EP | 899673 | 3/1999 | |
| EP | 0 998 108 A1 | 5/2000 | H04M 3/523 |
| EP | 1 120 729 A2 | 1/2001 | G06F 17/60 |
| EP | 1091307 | 4/2001 | |
| EP | 1 081 930 A1 | 7/2001 | H04M 3/51 |
| EP | 1150236 | 10/2001 | |
| EP | 1 564 977 A3 | 8/2005 | H04M 3/523 |
| GB | 2273418 | 6/1994 | |
| GB | 2290192 | 12/1995 | |
| WO | WO 96/07141 | 3/1996 | |
| WO | WO 97/28635 | 8/1997 | |
| WO | WO 98/56207 | 12/1998 | |

OTHER PUBLICATIONS

Virtual Hold® Technology "Solutions—FAQ" (printed Oct. 9, 2003) available at http://www.virtualhold.com/solutionsfaq.htm, 2 pages.
Virtual Hold® Technology "Solutions—Concierge" (printed Oct. 9, 2003) available at http://www.virtualhold.com/concierge.htm, 2 pages.
Virtual Hold® Technology "Solutions—Overview" (printed Oct. 9, 2003) available at http://www.virtualhold.com/overview.htm, 2 pages.
Virtual Hold® Technology "Solutions—Rendezvous" (printed Oct. 9, 2003) available at http://www.virtualhold.com/rendezvous.htm, 2 pages.
NetCall Telecom "NetCall Directory™" (printed Oct. 9, 2003) available at http://www.netcall.com/solutions/directory.asp, 2 pages.
NetCall Telecom "NetCall Alert™" (printed Oct. 9, 2003) available at http://www.netcall.com/solutions/alert.asp, 2 pages.
NetCall Telecom "NetCall HotDesk™" (printed Oct. 9, 2003) available at http://www.netcall.com/solutions/hotdesk.asp, 2 pages.
NetCall Telecom "NetCall NetCall800™" (printed Oct. 9, 2003) available at http://www.netcall.com/solutions/netcall800.asp, 1 page.
NetCall Telecom "NetCall FAQs" (printed Oct. 9, 2003) available at http://www.netcall.com/solutions/queuebuster_faqs.asp, 3 pages.
NetCall Telecom "NetCall QueueBuster" (printed Oct. 9, 2003) available at http://www.netcall.com/solutions/queuebuster.asp, 2 pages.
NetCall USA Brochure entitled "QueueBuster™ Take Your Customers Off Hold" (undated), 6 pages.
"The GM API—Table of Contents" (printed Oct. 9, 2003), available at http://www.myri.com/scs/GM/doc/gm_toc.html, 1 page.
"The GM API—Copyright Notice" (printed Oct. 9, 2003), available at http://www.myri.com/scs/GM/doc/gm_1.html, 2 pages.
"The GM API—About this Document" (printed Oct. 9, 2003), available at http://www.myri.com/scs/GM/doc/gm_2.html, 2 pages.
"The GM API—GM Overview" (printed Oct. 9, 2003), available at http://www.myri.com/scs/GM/doc/gm_3.html, 2 pages.
"The GM API—Definitions" (printed Oct. 9, 2003), available at http://www.myri.com/scs/GM/doc/gm_4.html, 2 pages.
"The GM API—Sending Messages" (printed Oct. 9, 2003), available at http://www.myri.com/scs/GM/doc/gm_8.html, 2 pages.
"The GM API—Receiving Messages" (printed Oct. 9, 2003), available at http://www.myri.com/scs/GM/doc/gm_9.html, 7 pages.
"The GM API—GM Constants and Macros" (printed Oct. 9, 2003), available at http://www.myri.com/scs/GM/doc/gm_15.html, 1 page.
"The GM API—Variable Index" (printed Oct. 9, 2003), available at http://www.myri.com/scs/GM/doc/gm_19.html, 1 page.
"The GM API—Token Reference" (printed Oct. 9, 2003), available at http://www.myri.com/scs/GM/doc/gm_17.html, 2 pages.
"The GM API—Glossary" (printed Oct. 9, 2003), available at http://www.myri.com/scs/GM/doc/gm_18.html, 2 pages.
Fried, Jeff. "Skills-based routing leverages agents' strengths," Telemarketing & Call Center Solutions, Feb. 1997 [Proquest].
Staples et al. "CTI evolution for the 'self service' customer," Telecommunications, Dec. 1998 [Proquest].
DEFINITY Communications System Generic 3 Call Vectoring/Expert Agent Selection (EAS) Guide, AT&T publication No. 555-230-520 (Issue 4, Sep. 1995).
"New Cicso ICM Integration Module for Avaya CONVERSANT" Spanlink, 2001, 2 pages.
U.S. Appl. No. 09/489,722, filed Jan. 24, 2000, Thomson.
U.S. Appl. No. 10/768,894, filed Jan. 29, 2004, Goringe et al.
U.S. Appl. No. 11/518,096, filed Sep. 8, 2006, Brunson.
U.S. Appl. No. 09/489,722, filed Jan. 24, 2000, Fisher et al.
Background of the Invention for the above-captioned application (previously provided).
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.

(56) References Cited

OTHER PUBLICATIONS

Avaya, Inc., "The Advantages of Load Balancing in the Multi-Call Center Enterprise," Avaya, Inc., 2002, 14 pages.

Avaya, Inc., "Voice Over IP via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality in IP Voice Networks," Avaya, Inc., 2002, pp. 1-17.

Dawson, "NPRI's Powerguide, Software Overview" Call Center Magazine (Jun. 1993), p. 85.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Foster, Robin, et al., "Avaya Business Advocate and its Relationship to Multi-Site Load Balancing Applications," Avaya, Inc., Mar. 2002, 14 pages.

GEOTEL Communications Corporation Web site printout entitled "Intelligent CallRouter" Optimizing the Interaction Between Customers and Answering Resources., 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999), 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

\* cited by examiner

AGENT-ENABLED QUEUE BYPASS TO AGENT

FIELD OF THE INVENTION

The invention relates generally to contact centers and particularly to servicing incoming contacts in contact centers.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled. The term "contact" or "call" as used herein is intended to include not only telephone calls but also non-telephonic communications, such as data transmissions such as electronic mail, voice-over-IP, facsimile, etc., whether circuit switched or packet switched.

The primary objective of contact center management, including call-distribution algorithms, is to ultimately maximize contact center performance and profitability. This objective has been implemented using a myriad of contact routing, or work item distribution, algorithms. However as available contact media changes, established contact routing algorithms become obsolete and need to be changed.

Dropped wireless calls represent such an impetus for change, particularly given the increased use of mobile and battery operated communication devices. Dropped calls in a contact-center environment are particularly aggravating to wireless callers because of the time (and therefore expense) it takes to reach an agent prior to obtaining service and the caller's need to start over again in reaching and/or providing information to an agent. Dropped calls adversely impact agent satisfaction and contact center performance and profitability because the time spent with the caller often does not result in being able to close a work item efficiently. When the caller next calls the contact center, he or she must again use scarce processing resources, such as an Interactive Voice Response or IVR unit and a position in one or more call queues. Requeuing a dropped contact increases wait time not only for the dropped caller but also for other callers.

When the call is dropped after it has been delivered to an agent and before the servicing of the contact is completed, the contact center has additional problems. The thread between the dropped caller and agent is lost along with information respecting the state of servicing the customer before the contact was dropped. Often, the recorded state excludes significant information omitted by the agent. When the caller calls back, there is no guarantee, and typically a low probability, that the caller will be connected with the same agent before the information is irretrievably lost (i.e., forgotten by the agent).

Data-driven last-agent routing is a well known and implemented technique in contact center product offerings. This feature permits an existing contact center customer to be routed to an agent with whom the customer has had prior contact. The redirection is data-driven in that a set of data structures is maintained linking the customer with the agent. However, this feature is customer configurable and may or may not be activated. When activated, it is automatic. Agents therefore have no ability to invoke selectively the feature on an "as needed" basis.

SUMMARY OF THE INVENTION

These and other needs are addressed by the various embodiments and configurations of the present invention. The present invention is directed generally to providing preferential treatment to voluntarily and involuntarily abandoned contacts.

In a first embodiment of the present invention, a method is provided for servicing contacts that includes the steps of:

(a) receiving a queue bypass request for a specified first customer; and (b) updating a set of data structures associated with the specified first customer to indicate that the first customer is entitled to bypass queue positions when the first customer again contacts the contact center.

In one configuration, once the identity of the caller is established (such as by data collection techniques (e.g., caller-identification, Dual Tone Multi-Frequency or DTMF entries by the caller) or prescreening by an agent), the call is associated with a customer record in the database of the contact center, and the customer record provides input to the contact routing algorithms. The invention adds information to the customer record signifying that the last agent has authorized an incoming call from the customer to be routed to the head of the queue assigned to that last agent. The authorization is placed in the customer record by the agent at the conclusion of the prior call, when the agent determined that the call ended prematurely. The authorization from queue bypass is time-limited providing a window of opportunity for the caller to re-establish the call using, perhaps, a different device. At the end of the time period, the authorization silently expires, and the call center reverts to routing calls from the customer in the normal fashion.

In one configuration when the agent is already busy on another call at the time the previous caller re-establishes the call, the caller, while waiting in first-in-queue for the last agent, hears an announcement that the contact center has given preferential treatment to the caller and placed the call next-in-line for the last agent. The caller also hears an option to opt-out to the next available agent instead of continuing to wait. Thus, the agent has offered and authorized preferential treatment, and the caller may accept or decline such treatment.

In one configuration, the embodiment allows a contact center agent, who experiences a dropped call, to activate temporarily last-agent queue-bypass routing on behalf of the caller so that, when a call back is received from the caller, the same agent can continue servicing the call. Dropped calls thus can have a much shorter time to reach the last agent than generally enqueued calls. Moreover, a contact center may have reasons not to implement last-agent routing for all incoming calls. This feature can be invoked by the agent on any condition that the agent deems warrants special treatment. Thus, the agent, who is handling the call and knows best what to do to preserve customer loyalty, is given authorization to invoke the feature.

In a second embodiment, a method is provided that includes the steps of:

(a) determining that an enqueued first contact from a first customer has been disconnected; and (b) updating a set of data structures associated with the first customer to indicate that the first customer is entitled to preferential treatment when the first customer again contacts the contact center.

As in the case of the prior embodiment, this embodiment can protect against dropped calls. The dropped call protection is extended by the present embodiment to include calls dropped while in queue. Because both embodiments preferably keep call state in the database and not in the communications infrastructure, the preferential treatment is customer-specific and protocol and communication path independent. By providing dropped call protection, both embodiments can provide increased levels of customer loyalty and satisfaction.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
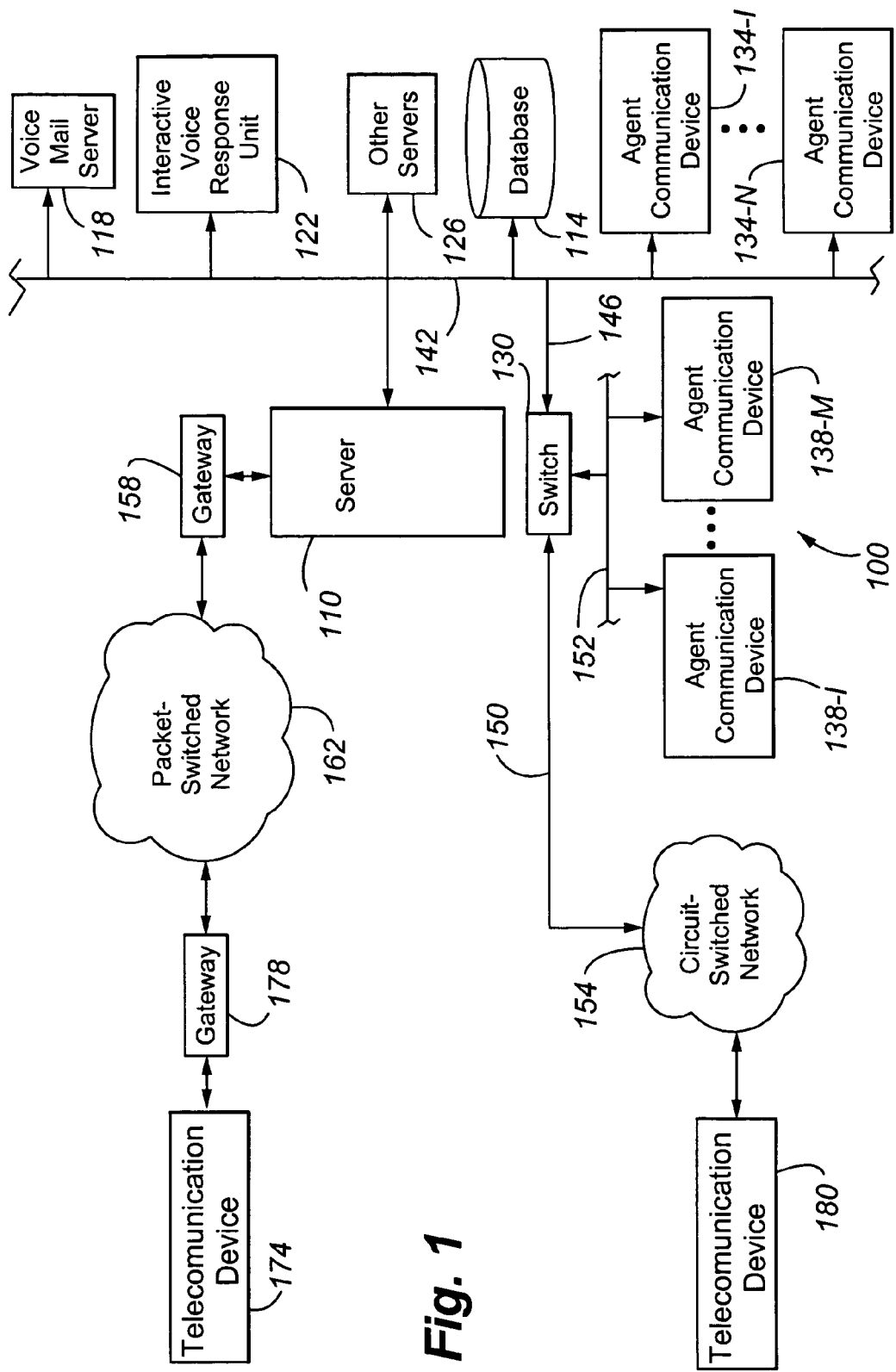
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information, such as customer name, customer contact information, customer financial information, customer transaction history, customer class or type, account number, and the like, and other information that can enhance the value and efficiency of the contact processing, such as queue bypass flag value, queue bypass timestamp (indicating when the call was dropped and/or the agent set the queue bypass flag value), identity (or pointer to the data structures) of the agent who set the queue bypass flag, and queue bypass time interval (indicating the time period during which the contactor can again contact the contact center and be provided with preferential service), and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Communication Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
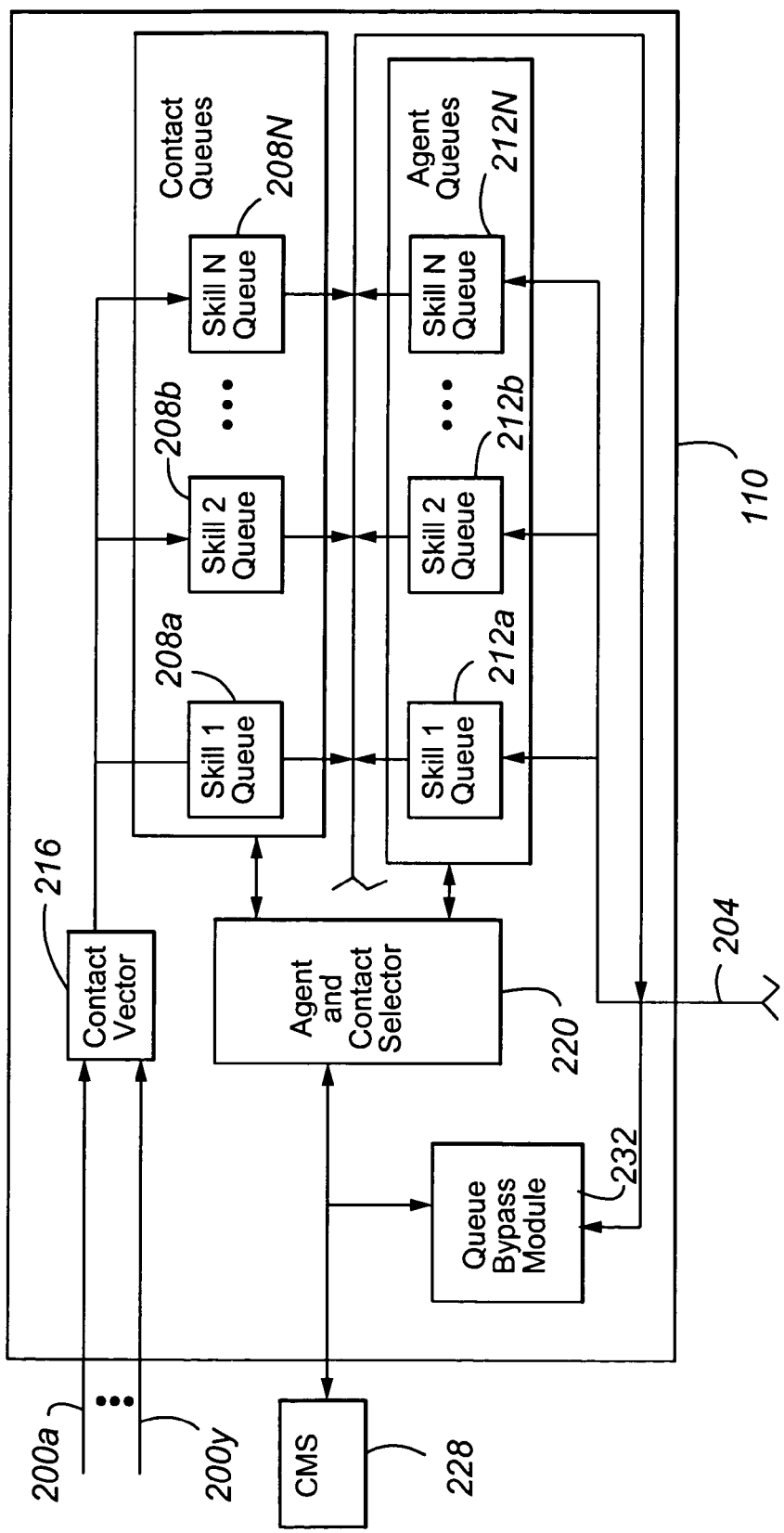
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 152). The server 110 can include a Basic Call Management System™ or BCMS 224 and a Call Management System™ or CMS 228 that gathers call records and contact-center statistics for use in generating contact-center reports. CMS and BCMS and any other reporting system, such as Operational Analyst™ will hereinafter be referred to jointly as CMS 228.

The switch 130 and/or server 110 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second communication devices 138-1, . . . 138-M are time division multiplexed and/or circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the switch 130, which in turn forward instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110 and information respecting agent servicing of the contacts is stored in the database 114.

According to the invention, a queue bypass module 232 is provided. The module 232 is stored either in the main memory or in a peripheral memory (e.g., disk, CD ROM, etc.) or some other computer-readable medium of the center 100. The module 232 receives and configures data structures evidencing agent requests to provide customers with a queue bypass option that is valid for a queue bypass time period. The module 232 identifies incoming contacts from customers entitled to receive a queue bypass option, moves the contact to the head of a queue, and thereby effects direction of the incoming contact to an appropriate agent for servicing. The queue bypass option thus permits agents to provide customers, that are unable during the initial contact with the agent to receive full service, such as due to a dropped call or the need to perform an operation (such as turning on a computer in a computer service call, retrieving documents containing needed transaction identification information, and the like) as part of the servicing, with preferential treatment in a later contact respecting the same matter with the same or a different agent.

By storing the queue bypass flag and queue bypass period values in the customer's set of data structures in database 114, the module 232 is able to link the queue bypass option with the customer directly rather than only with his or her communication device. This permits the customer to call back using the same or a different communication device, whether using the same or a different communication mode or the same or different communication path or protocol, and receive preferential treatment via the queue bypass option. For example, if the battery in the customer's cellular telephone dies the customer can use a friend's cellular telephone to call back the contact center. Although the customer would not be identified by digit analysis, the IVR unit 122 would identify the customer through its interactive query/response menu and notify the queue bypass module 232 that the customer has called back. In the above example, the customer could also call back via a different communication medium, such as by a wired packet-switched or circuit-switched telephone, and, after identification by the IVR unit 122, receive preferential queue bypass treatment. In one configuration, the customer is given, such as by an electronic message or outbound automated voice call, a specific number or electronic address to use for the call back. By using this number, which can be varied by the contact center daily or weekly, the call back is readily identified as a call back eligible for queue bypass treatment.

When the queue bypass option is set by the agent, the agent may further set, or the module 232 select independently of the agent, the queue bypass period during which the corresponding customer can call back and access or exercise the queue bypass option. The length of the queue bypass period can depend on many factors. For example, it can depend upon the maximum amount of time that an average agent will remember details of the partially serviced interaction with the customer, the time required to call back the contact center by the selected media type, the type of communication pathway used in the call back (e.g., the time required to call back the contact center by a specific media type can vary), the time required to be identified by the automated response unit, and the reason for setting the queue bypass option (e.g., if a cellular phone call was dropped it could be because the cellular phone signal is too weak or the cellular phone battery died, either of which may require a longer queue bypass period, or if the customer, as part of a warranty call, has been asked to try an operation on a device and call back the contact center). For example, a live voice call back, the option period could be 15 minutes. For an instant messaging call back, the option period could be 20 minutes because of the need to type in responses to an automated interactive response unit, such as an IVR.

The queue bypass option may cause the call back customer to be connected to the same or a different agent. Upon call back, the customer can be queried whether or not he or she wishes to be connected with the same agent and advised of the corresponding wait time or whether or not he or she would wish to be connected with another or first available agent and advised of the corresponding wait time. In either case, the customer is moved to a higher position, or a position closer to the head of the queue, than he would otherwise be moved to in the absence of the queue bypass option. In one configuration, the contact proceeds immediately to the head of the queue and awaits servicing by a selected agent. In one configuration, the agent determines whether or not the customer is to be directed to him or her on call back or whether the customer can have the option to be directed to any agent on call back. This configuration reflects the fact that the agent servicing the customer knows best the reason for the call back and the state of servicing of the contact at the time of premature termination; thus, the agent knows best what to do with the call back.

By way of illustration, the customer, upon call back, can be provided with an audio and/or video notification that he or she is entitled to exercise the queue bypass option and what the option means. For example, the module could notify the customer using a notification such as:

> We understand that your call was interrupted. Would you like to receive service from the prior agent or from the first available agent. The estimated wait time to receive service from the prior agent is X minutes. The estimated wait time to receive service from the first available agent is Y minutes. Press "1" if you would like to receive service from the prior agent and "2" if you would like to receive service from the first available agent.

The operation of the queue bypass module 232 will now be discussed with reference to FIGS. 3-4.

Figure 3:
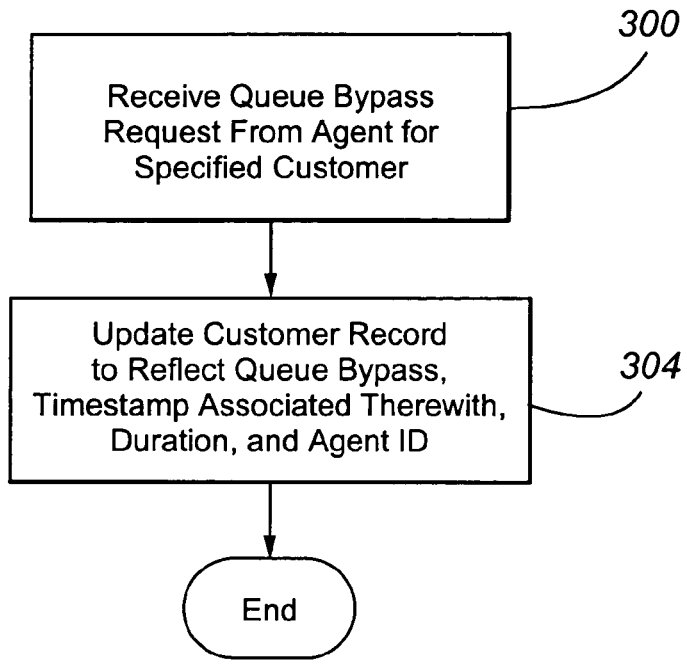
FIG. 3 is a flow schematic of a queue bypass agent according to an embodiment of the present invention.

Referring to FIG. 3, an agent decides that he or she wishes to give a customer a queue bypass option. As noted, this option can be, for example, because the call was dropped during and before completion of service, the customer needed to locate documentation needed by the agent to complete the service, and the customer needed to perform a series of operations, such as turning on a computer during a computer servicing call, prior to the agent being able to complete the service.

In any event, the queue bypass module 232, in step 300, receives, from the agent's station, the queue bypass request for an identified customer. Customer identification by the agent, or association of the option with the customer, can be based on the electronic address of the contacting customer communication device and/or a unique customer identifier, such as a record locator, a social security number, a driver's license number, an account number, a customer's name, and the like. Because the agent is normally in the middle of data entry into the customer's record when the queue bypass request is generated, customer identification is normally done with reference to the customer's record locator or account number.

In step 304, the module 232, in response to the request, updates the customer record to reflect the queue bypass option. This step normally request the queue bypass option flag to be set in the customer's record along with a corresponding timestamp indicating when the option starts and/or when the option ends. In the former case, a queue bypass duration or time period is included in the record. Finally, the identifier of the agent making the request is included in the customer's record. In one configuration, a pointer or link to the agent's record is included in the customer's record.

Figure 4:
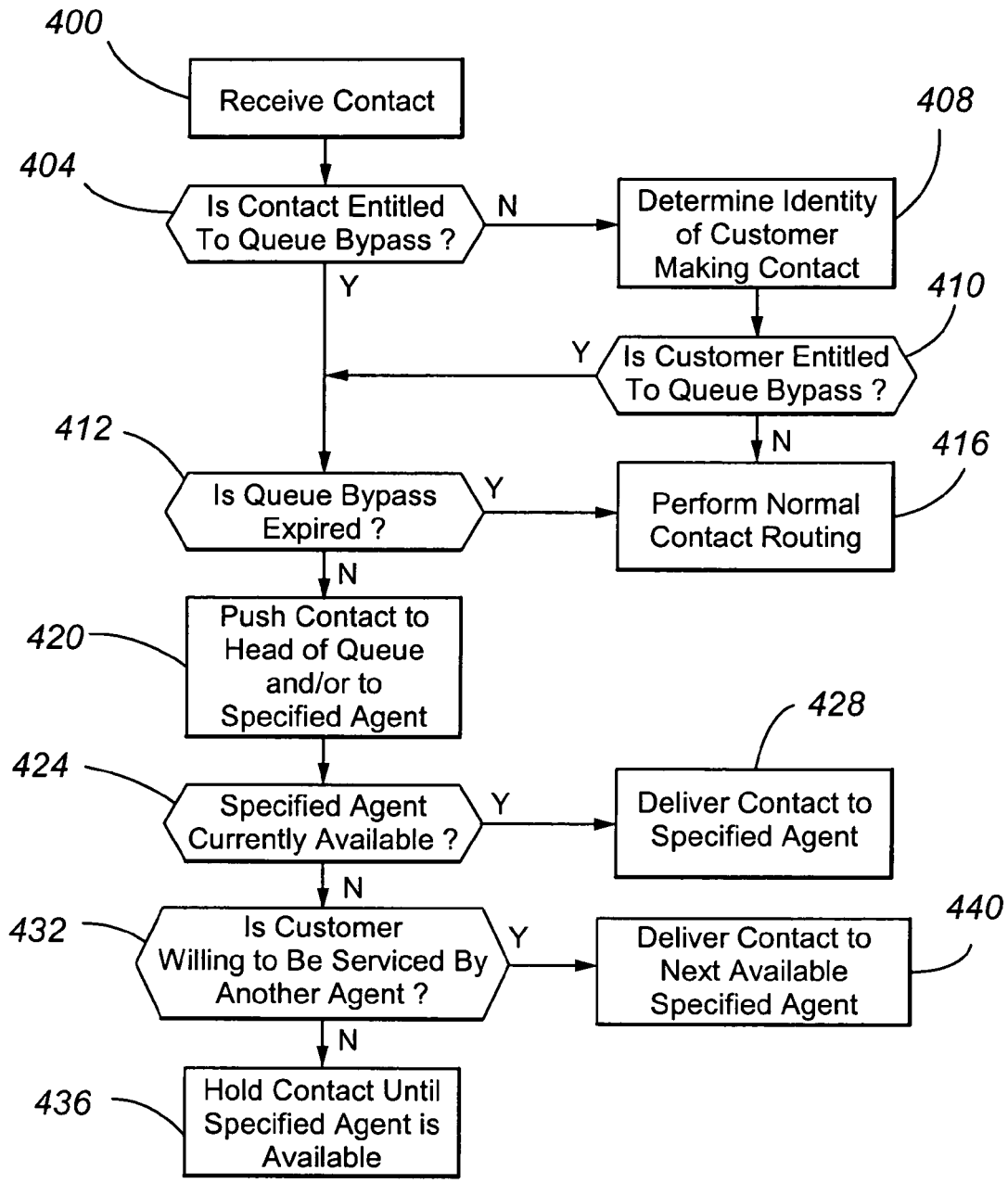
FIG. 4 is a flow schematic of a queue bypass agent according to an embodiment of the present invention.

Referring now to FIG. 4, the process to invoke the option will be discussed.

In step 400, an incoming contact from the customer is received in step 400. The customer is initially identified, such as by digit analysis (e.g., using Automatic Number Identification or ANI digits, Dialed Number Identification Service (DNIS), or caller identification information) for a voice call or source address for a packet-switched communication (e.g., an instant message, an email, or a Voice over IP or VoIP call).

In decision diamond 404, the module 232 determines whether the incoming contact is entitled to a queue bypass option. If not, the module 232 proceeds to step 408 and determines the identity of the customer making the contact using an automated response unit, such as IVR unit 122.

In decision diamond 410, the module 232 again determines whether the incoming contact is entitled to the queue bypass option by virtue of being identified as a particular customer. As will be appreciated, the decision diamond is repeated because the customer may be calling back using someone else's communication device.

If the customer is entitled to use the queue bypass option in decision diamonds 404 or 410, the module 232, in decision diamond 412, determines, based on the customer's records, whether the queue bypass has expired. When the queue bypass option has expired or when the customer is not entitled to the queue bypass option in decision diamond 408, the agent and contact selector 220 performs normal contact processing/routing in step 416. In one configuration, the ability of the customer to exercise the queue bypass option further requires the agent giving the customer the option to be available within a selected wait time and/or to be on duty. If the agent will not be available within the selected wait time or is off duty, the customer contact is not entitled to the queue bypass option. The period, thus, often reflects the time at which the agent will be on or off duty.

If the queue bypass option has not expired in decision diamond 412, the module 232, in step 420, pushes the contact to the head of the queue and/or to the specified agent giving the customer the queue bypass option.

In decision diamond 424, the module 232 determines whether the specified agent is currently available. If so, the module 232 in step 428 delivers the contact to the specified agent.

If not, the module 232 in decision diamond 432 determines whether or not the customer is willing to be serviced by another agent. This can be done by providing the customer with the message quoted above, for example. If the customer elects to be serviced by the first available agent (even though that service may take longer than using the specified agent who is already familiar with the customer's needs), the module 232, in step 440, delivers the contact to the first (or next) available agent. If the customer does not want to be serviced by the first or next available agent, the module 232, in step 436, delivers the contact to the specified agent when that agent is available.

In another embodiment, the functionality of the module 232 is broadened to include preferential treatment for contacts abandoning while in queue. Abandonment of the contact can be for a variety of reasons, including customer frustration with queue wait times, the customer's immediate need to attend to a personal matter (such as changing a diaper on or otherwise assisting a child), and loss of connection. When an abandonment occurs, the module, rather than offering a complete queue bypass, could give the contactor the same queue position he had at the time of abandonment or put a placeholder in an advanced queue position reflecting the time progression of the contactor's queue position at the time of abandonment. This option would however only be given the contactor if he or she were to call back within a determined period of time. Alternatively, the module 232 could track accumulated time in queue for the contactor and provide him or her with the benefit of that accumulated time in queue if the contactor calls back within a determined period of time. The contactor would be placed in a queue position commensurate with the accumulated amount of actual wait time. For example, if the accumulated wait time is 10 minutes and queue position 5 has an accumulated wait time of 9.5 minutes while queue position 4 has an accumulated wait time of 10.2 minutes, the contactor would be given queue position 5 while the person currently having queue position 5 would be bumped to the next higher queue position, or queue position 6. In either event, the contactor would receive a higher queue position (or a queue position closer to the head of the queue) than he or she would otherwise receive in the absence of the option.

The operation of the queue bypass module 232 according to this embodiment will now be discussed with reference to FIGS. 5-6.

Figure 5:
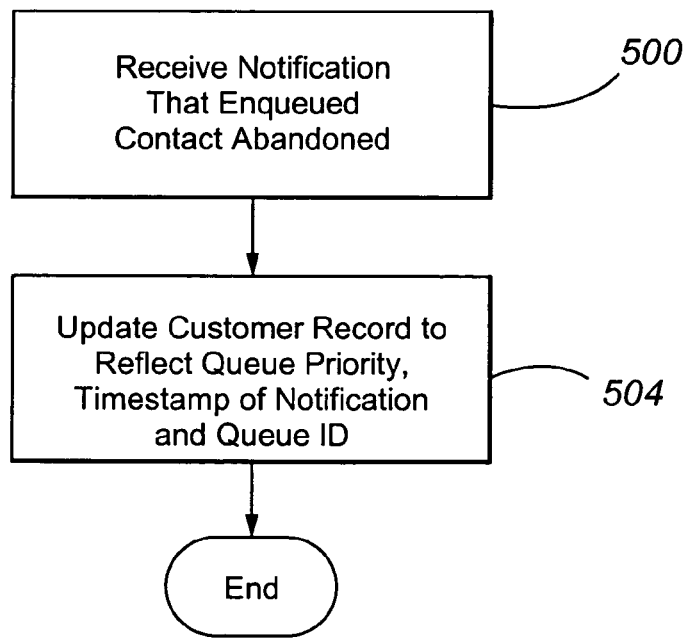
FIG. 5 is a flow schematic of a queue bypass agent according to an embodiment of the present invention.

With reference to FIG. 5, in step 500 the module 232 receives notification that an enqueued contact has abandoned before being delivered to an agent. In step 504, the customer's record is updated to reflect the queue priority to be given him or her, the timestamp of the notification, and a queue identifier. The queue identifier identifies the queue in which the contact was located at the time of abandonment.

Figure 6:
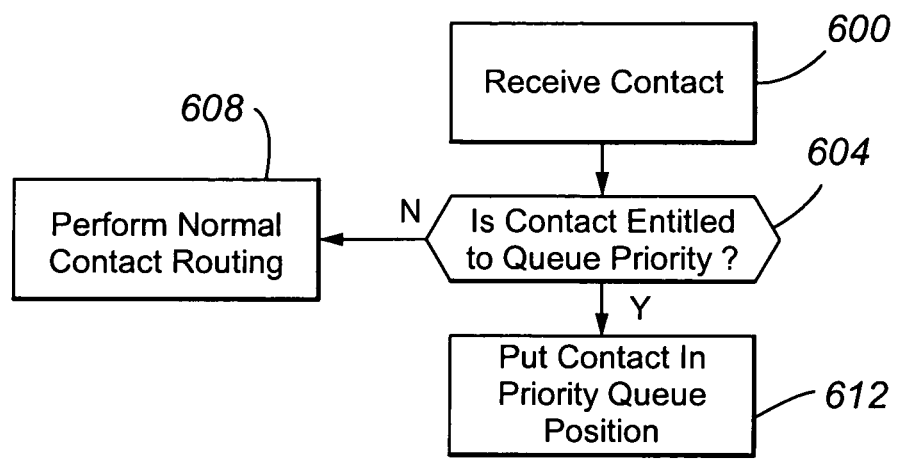
FIG. 6 is a flow schematic of a queue bypass agent according to an embodiment of the present invention.

With reference to FIG. 6, the abandoning contactor has called back in step 600.

In decision diamond 604, the module 232 determines whether the incoming contact is entitled to queue priority. This is done by identifying the customer as noted above and determining from the customer's record whether a queue priority flag is set and/or whether a queue priority field is populated. The queue priority field records information such as a queue position at the time of abandonment, timestamps indicating when the abandoned contact was originally received, placed in the identified queue, and/or abandoned or an accumulated amount of time, and an cumulative amount of time the abandoned contact was in the identified queue before being abandoned. The module 232 further confirms whether or not the contactor has called back within a determined period of time. When the contact is not entitled to queue priority or would be entitled to queue priority but has failed to call back within the determined period of time, the module 232 in step 608 performs normal contact routing of the contact. When the contact is entitled to queue priority and the call back occurred within the determined period of time, the module 232 provides the contact with queue priority in step 612.

A number of variations and modifications of the invention can be used. It would be possible to provide for some features of the invention without providing others.

For example in one alternative embodiment, an outbound contact is initiated to the communication device that dropped the contact. The outgoing contact may be a voice call from the agent and/or a screen display advising the customer of the availability of the queue bypass option.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a contact, comprising:
    receiving, by a processor, from a first human agent of a contact center, a queue bypass request for a first customer, wherein the queue bypass request authorizes the first customer to be placed at a head of a queue associated with the first human agent, wherein the queue bypass request is received without an associated failure of the first incoming contact;
    in response to receiving the queue bypass request, retrieving, by the processor, a set of data structures associated with the first customer, wherein the set of data structures includes an address for each of two or more communication devices associated with the first customer; and
    updating, by the processor, the set of data structures with the queue bypass request to indicate that the first customer is authorized, by the first human agent, to be placed at the head of the queue associated with the first human agent, when the first customer again contacts the contact center.

2. The method of claim 1, wherein the first customer is associated with a prior first contact with the contact center and further comprising:
    receiving a further second contact;
    determining, based on digit analysis or source address, whether a customer associated with the second contact is the first customer; and
    in response to determining that the second contact is from the first customer, the second contact being placed at the head of the queue associated with the first human agent.

3. The method of claim 2, further comprising:
    determining that the second contact is from a person other than the first customer and further comprising:
    an automated response unit determining that the second contact is not from the first customer; and
    the second contact not being placed at the at the head of the queue associated with the first human agent.

4. The method of claim 2, wherein the first and second contacts are made using different contact media.

5. A tangible, non-transitory computer readable medium comprising processor executable instructions operable to perform the steps of claim 1.

6. A contact center, comprising:
    a database operable to contain customer records, the customer records including a data structure associated with a first customer;
    a plurality of agent communication devices corresponding to a plurality of agents;
    a switching fabric operable to connect a first incoming contact with an agent communication device, wherein the first incoming contact is associated with a first communication device address associated with the first customer;
    a plurality of contact queues operable to queue contacts awaiting servicing by an agent; and
    a server including a processor and memory, the server executing a queue bypass module, the queue bypass module operable to:
        receive, from a first agent of the contact center, a queue bypass request associated with the first customer, wherein the queue bypass request authorizes the first customer to bypass at least one queue position in a queue associated with the first agent, wherein the queue bypass request is received without an associated failure of the first incoming contact;
        update the data structure associated with the first customer to include the queue bypass request to indicate that the first customer is entitled to bypass at least one queue position when the first customer again contacts the contact center;
        receive a second incoming contact from the first customer, wherein the second incoming contact is associated with a second communication device address;
        based on the second communication device address, determine that the second incoming contact is associated the first customer; and in response to determining that the second incoming contact is from the first customer, cause the second incoming contact to be placed at a head of the queue associated with the first agent.

7. The contact center of claim 6, wherein determining that the second incoming contact is associated the first customer comprises:
at least one of digit analysis or analysis of the source address of the second incoming contact; and
locating the second communication device address in the data structure.

8. The contact center of claim 7, wherein the queue bypass module initially determines that the second contact is from a person other than the first customer and further comprising:
an automated response unit determining that the second contact is not from the first customer; and wherein the queue bypass module is further operable, in response to the automated response unit, to prevent the second contact from being placed at the head of the queue associated with the first agent.

9. The contact center of claim 7, wherein the second contact is not placed at the head of the queue associated with the first agent when a queue bypass period has expired before the second contact is received.

10. The contact center of claim 7, wherein the first and second contacts are made using different contact media.

11. A method for directing contacts in a contact center, comprising:
receiving a queued first contact, from a first communication device associated with a first customer;
receiving, by a processor, from a first human agent of a contact center, a queue bypass request for the first customer, wherein the queue bypass request authorizes the first customer to be placed at a head of a queue associated with the first human agent, wherein the queue bypass request is received without an associated failure of the first incoming contact;
automatically updating a data structure associated with the first customer to indicate that the first customer is entitled to preferential treatment when the first customer again contacts the contact center, wherein the preferential treatment is for the first customer to be placed at the head of the queue associated with the first human agent;
receiving a second contact, from a second communication device associated with the first customer;
based on an address associated with the second communication device, retrieving the data structure; and
based on the indication that the first customer is entitled to preferential treatment in the data structure, altering the queue position for the second contact by placing the customer at the head of the queue associated with the first human agent.

12. The method of claim 11, wherein the second contact is placed in a same queue as the first contact, the method further comprising upon receiving the second contact, providing the first customer an option to opt-out to a next available agent.

13. A tangible, non-transitory computer readable medium comprising processor executable instructions operable to perform the steps of claim 11.

* * * * *